United States Patent [19]
Roth et al.

[11] 3,977,907
[45] Aug. 31, 1976

[54] RECHARGEABLE BATTERY ENCLOSURE

[75] Inventors: Gary L. Roth, Littleton; Merrill H. McGlamery, Florence, both of Colo.

[73] Assignee: The Gates Rubber Company, Denver, Colo.

[22] Filed: Nov. 28, 1975

[21] Appl. No.: 636,259

[52] U.S. Cl. .............................. 136/132; 136/135 R; 136/181; 339/152; 339/183
[51] Int. Cl.² ..................... H01M 2/02; H01R 13/50
[58] Field of Search ............ 136/181, 107, 132, 108, 136/166, 169, 135 R; 339/152, 183

[56] References Cited
UNITED STATES PATENTS

| | | | |
|---|---|---|---|
| 1,266,814 | 5/1918 | Kammerhoff | 136/135 R |
| 2,209,185 | 6/1940 | Bower et al. | 136/135 R |
| 3,056,850 | 10/1960 | Rauske et al. | 136/135 R |
| 3,650,841 | 3/1972 | Brindley | 136/132 |

*Primary Examiner*—Donald L. Walton
*Attorney, Agent, or Firm*—Curtis H. Caslteman, Jr.; Raymond Fink; H. W. Oberg, Jr.

[57] ABSTRACT

A one-piece top closure for a battery enclosure such as a lantern battery is described including a substantially planar top surface in which is integrally mounted a recharge jack, and a spacer surface which extends normally to the top surface adapted to bear against the rechargeable electrochemical cells contained within the enclosure, so as to immobilize the cells. In another aspect, an improved recharge jack is described.

12 Claims, 7 Drawing Figures

RECHARGEABLE BATTERY ENCLOSURE

BACKGROUND OF THE INVENTION

This invention relates to rechargeable battery enclosures, and more particularly to exterior closures for such battery enclosure in which is integrally mounted a rechargeable jack assembly for reception preferably of a coaxial type recharge plug.

Two conductor coaxial-type battery charger plugs are becoming widely used primarily because they are essentially short-circuit proof. The mating sockets or recharge jacks for use with coaxial plugs are generally made as a separate unit which is adapted to be molded in, slidably inserted or staked into a battery enclosure wall. These jack units are often intricate in design and incorporate a number of parts and lead connectors, and require numerous solder connections to wire the rechargeable battery structure. The large number of parts and assembly operations increase costs as well as reduce reliability.

Many types of battery enclosures such as lantern batteries include a separate spacer element, which may be made of cardboard, for instance, which serves to position the cells from the enclosure surface (which carries the recharge jack) providing space for leads, connectors, and relays, for instance. The use of a separate spacer such as this increases assembly costs and does not always provide a positive spacing between the enclosure and cells, the latter needing to be immobilized under many applications.

It is the primary object of this invention to overcome the above-cited problems, by providing a substantially rigid one-piece battery enclosure assembly which includes a spacer portion, and also an integral recharge jack of simplified construction and which is made a permanent portion of the closure wall.

SUMMARY OF THE INVENTION

In one aspect, the invention pertains to a battery enclosure having a substantially polygonal cross-section cup-shaped container, a top closure bridging the opening of the container, a battery disposed within the container, output terminals mounted exteriorly on the top and connected respectively to terminals of the battery, and a recharge jack mounted in the top and having contacts electrically connected to the battery, the improvement comprising a one-piece top closure comprising a substantially planar top surface in which is integrally mounted the recharge jack and output terminals, and having edge portions adapted to fixedly mount to said container, and a spacer integral with and extending substantially perpendicularly of said top surface and disposed inside the container and bearing against and substantially immobilizing the battery.

In another aspect, the invention pertains to a battery enclosure adapted to receive a coaxial-type plug in an associated jack for periodic recharging of a rechargeable battery positioned in the enclosure, the improvement comprising a recharge jack assembly comprising (a) a housing integral with an exterior surface of the enclosure and having a central axial opening for receiving the plug, the opening being defined by a tubular seat having a side slot therein; (b) a conductive post connected to the housing and extending from the bottom of the seat axially into the opening serving as a first contact for the jack; and (c) spring contact means having a first portion disposed in the opening serving as a second contact for the jack and resiliently movable to make biasing conductive contact with the outside of the coaxial-type plug, and a second portion, connected through the side slot to the first portion, mounted on the enclosure exteriorly of the housing and electrically connected to an output terminal of the battery.

BRIEF DESCRIPTION OF THE DRAWINGS

The invention will be more particularly described in its preferred embodiment in conjunction with the drawings, in which like numerals designate like parts, and in which.

PREFERRED EMBODIMENTS OF THE INVENTION

Figure 1:
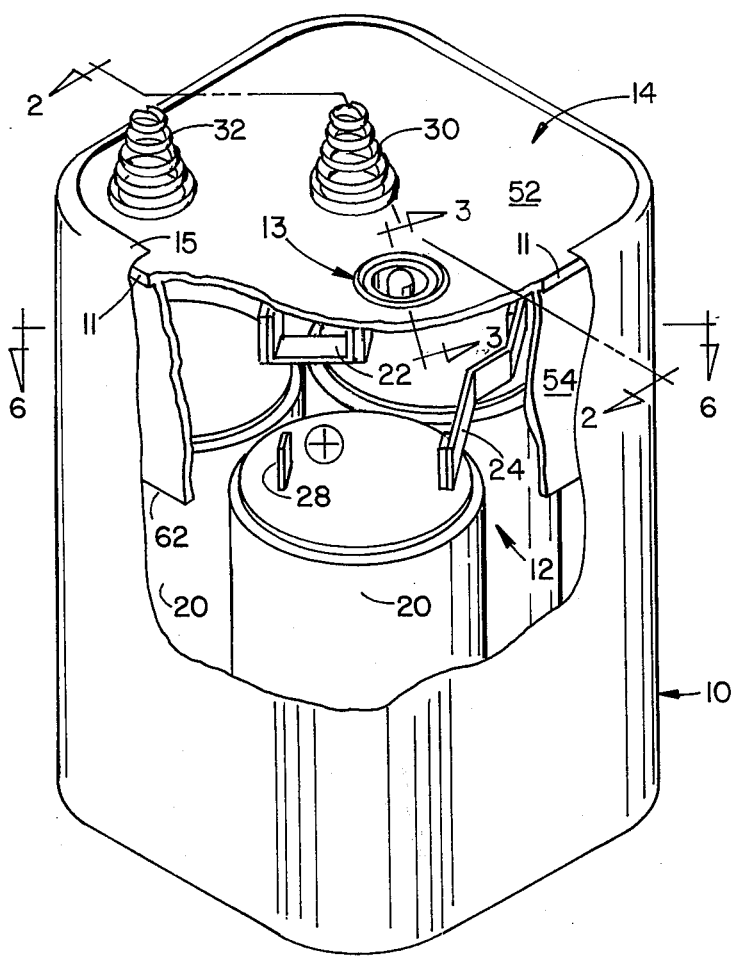
FIG. 1 is a partial cutaway perspective view of a lantern battery including the improved top closure of the invention, with some of the internal aspects omitted for clarity.

While the invention will be described with respect to a lantern battery structure, and more particularly to an improved top closure and recharge jack therefore, it will be appreciated that the invention broadly covers battery enclosures having a recharge jack contained in the enclosure wall. Thus, for instance, the invention pertains to such devices as rechargeable flashlights which may for instance have a jack at the end of the flashlight, rechargeable television sets, power tools, and the like in which an enclosure houses a battery, inter alia, and in which a recharge jack is contained in the wall of the enclosure with connections to the battery for recharging.

Referring now to the drawings, a lantern battery assembly is shown generally comprising a cup-shaped container 10, a battery 12 contained within the lower portion of the container, and a unitary top closure 14.

The container 10 is preferably cup-shaped and has a polygonal cross-section with generally straight sides 16 and bottom 18 which together form a container for reception of at least one electrochemical cell 20. The battery shown is made up of three cells connected in series by straps 22 and 24. A unitized multi-cell battery may also be employed. The battery is provided with negative and positive terminals 26, 28.

Figure 2:
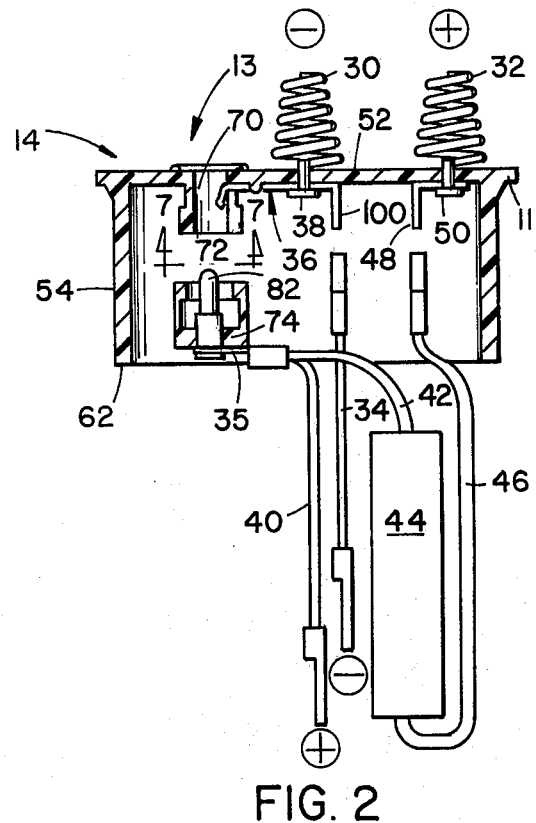
FIG. 2 is a schematic partial sectional, partial exploded view of the top closure viewed along section 2—2 of FIG. 1.

The battery terminals 26 and 28 are connected through the enclosure, respectively, to spring output terminals 30 and 32 via the electrical linkage shown in FIG. 2. As seen in that Figure, lead 34 is adapted to electrically connect terminal 26 to negative terminal 30 through spring contact means 36 (via connector lug 100) and through-the-wall rivet 38. On the other hand, in the preferred embodiment, battery terminal 28 is connected to output terminal 32 through leads 40, 42, element 44, which may be a high power resistor or short circuit relay, for instance, lead 46, connector 48 and through-the-partition rivet 50.

Figure 6:
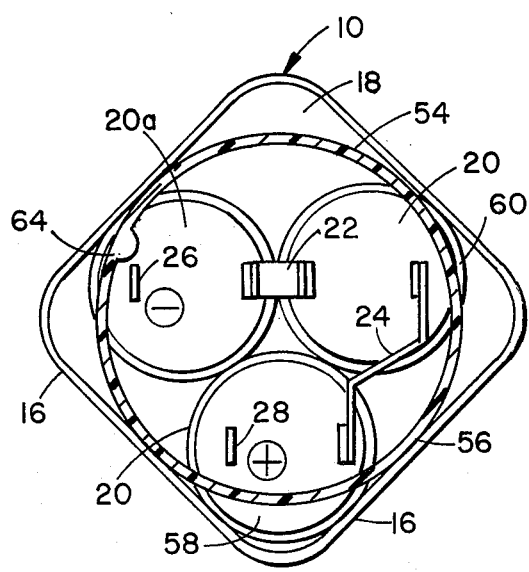
FIG. 6 is a view along section 6—6 of FIG. 1.

In accordance with the invention, the battery top closure 14 is of a one-piece construction having a generally planar top 52 from which depends an integral preferably molded, plastic spacer ring 54 which preferably is inscribed within the container 10 by making a number of points of contact, e.g., 56, therewith. The planar top is shaped similarly to the cross section of the container 10, and has ledge portions 11 about which the marginal portions 15 of the container can be crimped. The cross sectional shape of the spacer will be dictated by the configuration of the electrochemical cells disposed within the container, and the circular cross section shown is merely illustrative. The important criteria is that the spacer has sufficient side wall height that it touches and bears directly on the cells or otherwise substantially immobilizes them by being in close proximal relationship. As shown in FIG. 6 and also in FIG. 1, the ring 54 bears directly on top portions of the cells 20 since there are marginal portions, for instance shown at 58, 60 which are outside the cylinder formed by the ring 54 if it were projected downwardly. The bottom surface 62 of the ring bears directly or substantially directly on the top surfaces of the cells, as discussed. However, if ring 54 only bears slightly on the outer edge of one or more of the cells, such as with respect to cell 20a of FIG. 6, it is helpful to provide inward extension or shoulder 64, which provides the same function by bearing downwardly on an inward top surface of a cell of the battery.

In the planar portion 52 of the top closure, there are provided the aforementioned negative and positive contacts, 30, 32 which may be in the form of the spiral springs as shown, or as threaded studs, etc. There is also provided, in accordance with the invention, an integral jack assembly 13, which generally comprises a housing 66, conductive post 68 and spring contact means 36.

Figure 3:
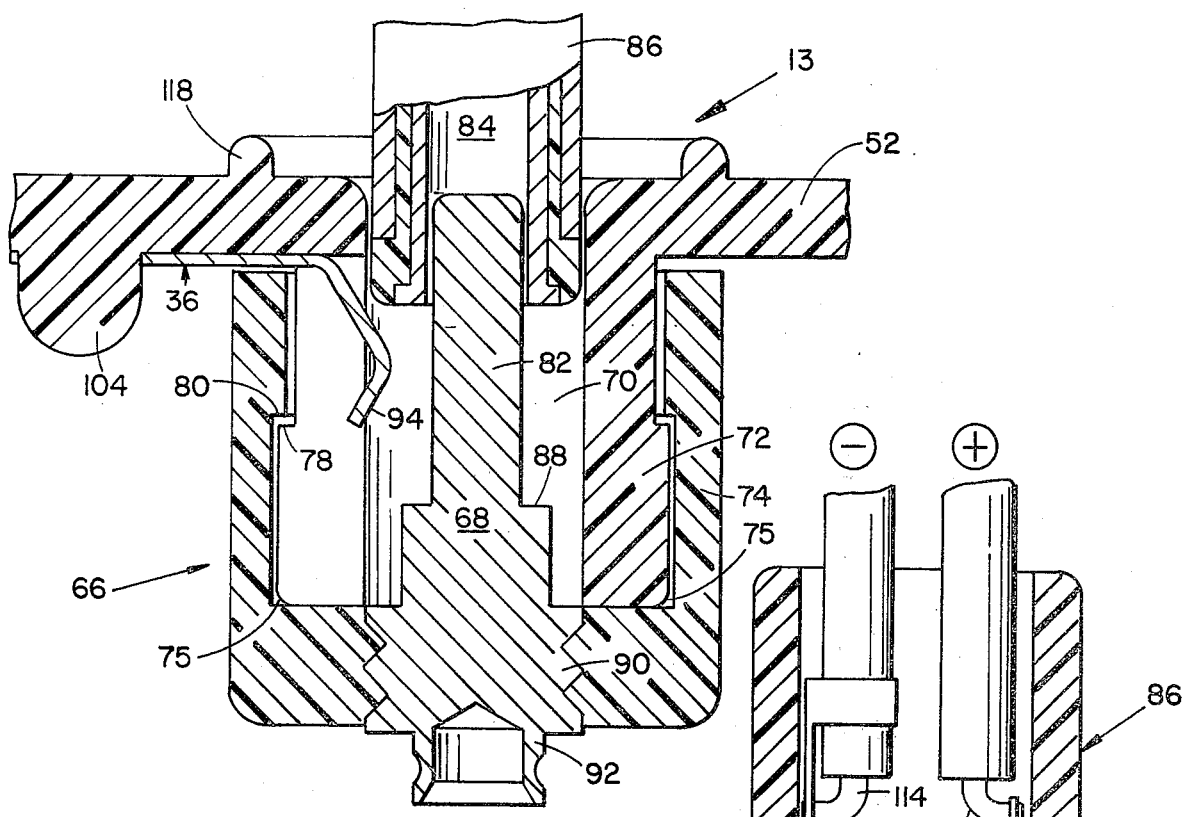
FIG. 3 is an enlarged view, looking along section 3—3 of FIG. 1, depicting the improved jack assembly of the invention with a coaxial-type plug partially inserted therein.
Figure 7:
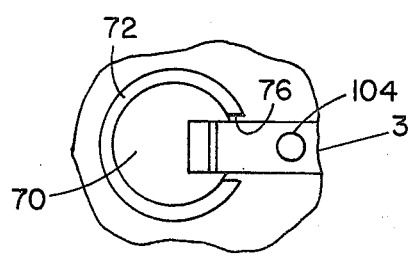
FIG. 7 is a partial bottom plan view of a portion of the jack.

Housing 66 in turn contains a central axial opening 70 defined by an adjacent seat which includes cylinder 72 and a telescoping interlocking outer sleeve 74. The cylinder is integral with and depends perpendicularly from the exterior surface 52 of the battery enclosure, and also incorporates a side slot 76, shown in bottom plan view in FIG. 7. A desirable secure connection between the slotted cylinder 72 and telescoping sleeve 74 is provided by respective interlocking shoulder portions 78, 80 on the two parts of the seat, shown spaced slightly apart in FIG. 3. It will be appreciated that the seat can be molded together with top 52 as a single unitary tubular piece rather than as a two-piece inner cylinder and outer sleeve.

Conductive post 68 is attached to and extends from the bottom of the seat and protrudes upwardly and axially into the opening 70 serving as a first contact for the jack. The post includes an upper portion 82 whose diameter is slightly less than the corresponding opening 84 in coaxial plug 86, a shoulder portion 88 against which the plug 86 bottoms out, and a portion 90 embedded (or threaded) in the seat to prevent relative movement therewith, and a connecting portion 92 which may be staked or riveted to lugged connector 35 (shown in FIG. 2).

Figure 5:
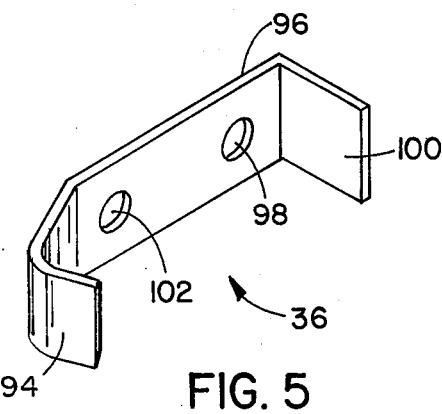
FIG. 5 is a perspective view of the spring clip contact.
Figure 4:
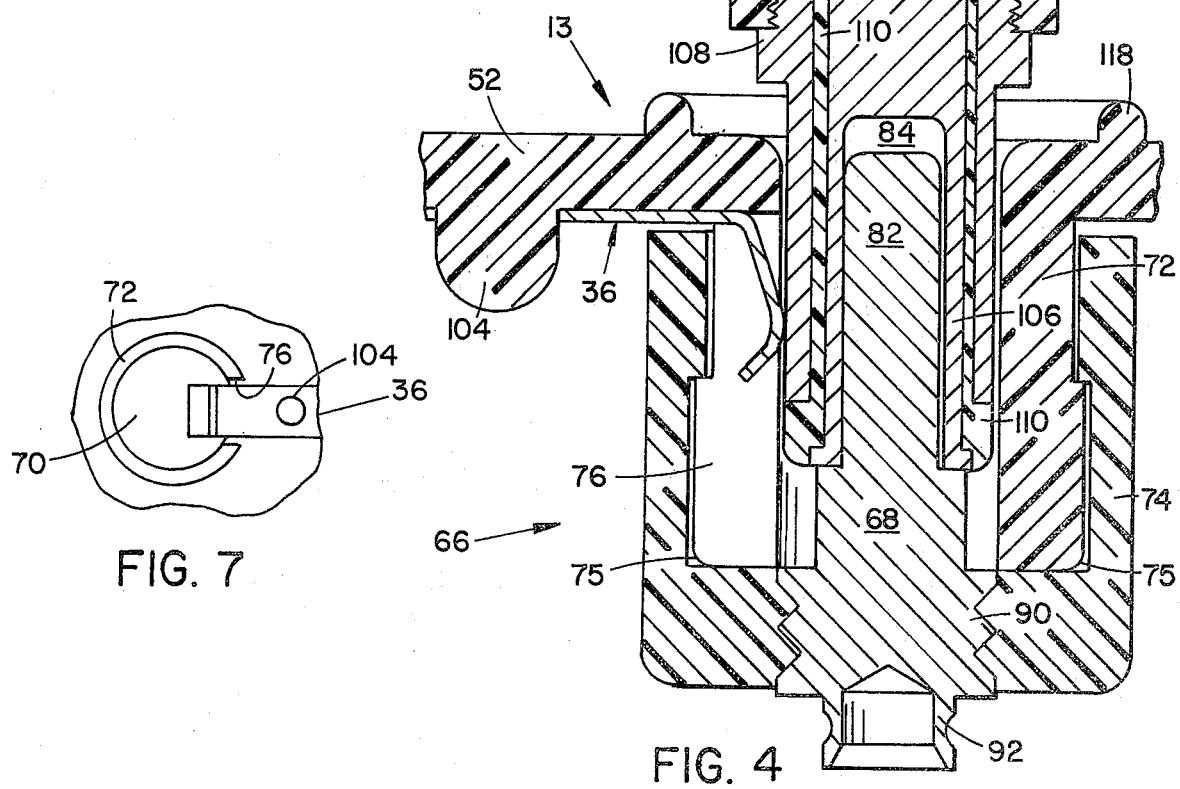
FIG. 4 is a view similar to FIG. 3 showing the plug fully engaged in the jack.

The spring contact means 36 has a first free end generally U-shaped portion 94 disposed within the opening defined by the slot 76 and axial opening 70 (prior to insertion of the plug), which serves as a second contact for the jack and which is resiliently movable as seen in FIG. 4 to make biasing conductive contact with the plug. The spring contact means also includes a second end portion 96 which is exterior of the housing 66 which is adapted to mount onto the enclosure with the aid of rivet 38, via opening 98 (FIG. 5). The spring contact means preferably has a connector lug 100 which serves as a contact for a push-on type connector attached to negative conductor lead 34. It is also preferred that the spring contact means contains an additional opening 102 which registers with embossment 104 of the top 14 so as to maintain the spring contact means in proper alignment.

To recharge the battery, coaxial plug 86 is inserted into the recharge jack of the invention, as shown in FIG. 4. The coaxial plug may be of standard type, including an internal positive polarity conductor 106, which makes contact on one side with post 82 with the aid of the sideward biasing force provided by spring contact 94, and a coaxially disposed negative conductor 108 which makes conductive contact with free end portion 94 of the spring 36. Between conductor portions 106 and 108 is disposed an annular insulator 110 made, for instance, of phenolic. Conductors 106 and 108 are connected in conventional fashion to positive and negative outlet leads 112, 114, respectively. The usual threaded protective insulator sleeve 116 forms a gripping portion for the coaxial plug. In customary manner, leads 112 and 114 will connect to a D.C. charging device of any desired type.

The recharge jack also preferably includes an outer molded annular rib 118 to serve as a recess for the plug, to further reinforce the top 52 where the jack is mounted, and to visually assist in alignment of the plug into the jack.

As shown, the entire top closure, including top 52, ring 54, and slotted cylinder 72 are formed of a single molded piece of plastic. In this embodiment, the outer sleeve 74 is molded about conductive post 68 into a single integral piece which is interlocked into position by a snap fit about cylinder 72 with the aid of beveled leading surfaces 75, the natural resilience of the plastic materials utilized, and the interlocking shoulders 78 and 80. The fit is designed to be permanent and cannot under normal operation be unlocked. The interlock can alternatively be provided by omitting the shoulders and chemically bonding or ultrasonically welding, for instance, the sleeve and cylinder.

It will be appreciated that the recharge jack of the invention utilizes only a minimum of parts for reduced assembly and maintenance costs. It is particularly advantageous to use a single conductive strip (spring contact 36) which functions as one contact for the jack for recharge as well as making connection to the output terminal of the battery through the enclosure wall for discharge. The jack construction is also virtually short circuit proof under normal expected usage. In the unusual event that short circuit does occur across the output terminals of the battery, element 44 will either act as a fuse to open the circuit, or limit the current to a safe level, depending on whether a short circuit relay or resistor is employed as element 44.

It will be appreciated that the invention is capable of a variety of modifications and variations which will become apparent to those skilled in the art upon a reading of the specification. These variations and modifications are intended to be included within the scope of the claims appended hereto.

What is claimed is:

1. In a battery enclosure having a substantially polygonal cross-section cup-shaped container, a top closure bridging the opening of the container, a battery having first and second terminals and comprising at least one rechargeable electrochemical cell disposed within the container, output terminals mounted exteriorly on the top closure and electrically connected respectively to said first and second terminals, and a recharge jack mounted in said top closure and having contacts electrically connected to said first and second terminals, an improved one-piece top closure in combination therewith comprising:

a substantially planar top surface on which is integrally mounted said recharge jack and output terminals, and having ledge portions adapted to fixedly mount to said container; and a spacer integral with and extending substantially perpendicularly of said top surface and disposed inside said container bearing against the battery thereby substantially immobilizing the battery.

2. The battery enclosure of claim 1 wherein the spacer side surface is inscribed in the polygonal container, touching its inner surface at a plurality of points.

3. The battery enclosure of claim 1 wherein the container has a substantially rectangular cross-section and the spacer is substantially cylindrical.

4. The battery enclosure of claim 3 wherein the cylindrical spacer is substantially inscribed within the rectangular container, making contact therewith.

5. The battery enclosure of claim 1 wherein the container mouth is crimped about the ledge portions of the top closure.

6. The battery enclosure of claim 1 wherein the spacer has an inwardly disposed shoulder bearing against the battery at one portion thereof.

7. In a battery enclosure adapted to receive a coaxial-type plug in an associated jack for periodic recharging of a rechargeable battery positioned in the enclosure, an improved recharge jack assembly comprising:

a housing integral with an exterior surface of the enclosure and having a central axial opening for receiving the plug, the opening being defined by a tubular seat having a side slot therein;

a conductive post connected to the housing and extending from the bottom of said seat axially into the opening serving as a first contact for the jack;

spring contact means having a first portion disposed in said opening serving as a second contact for the jack and resiliently movable to make conductive contact with the outside of said coaxial-type plug, and a second portion connected through said side slot to said first portion and mounted on said enclosure exteriorly of said housing and electrically connected to an output terminal of the battery.

8. The battery enclosure of claim 7 wherein said seat includes a downwardly protruding slotted cylinder integral with the exterior surface of the enclosure and a separate sleeve to which is affixed said conductive post, embracing and securely attached to the outer surface of said cylinder.

9. The battery enclosure of claim 8 wherein said cylinder and sleeve have resiliently interlocking shoulder surfaces precluding detachment in use.

10. The battery enclosure of claim 7 wherein said seat is formed of a unitary assembly comprising a downwardly protruding slotted cylinder in the end of which is embedded the conductive post.

11. The battery enclosure of claim 7 wherein the spring contact means comprises a substantially flat metal spring having a generally U-shaped free end serving as the first portion.

12. The battery enclosure of claim 11 wherein intermediate the first and second portions of the spring contact means is an aperture which registers with a protrusion formed in the enclosure to maintain alignment therewith.

* * * * *